UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

PROCESS OF OBTAINING CEMENT AND SOLUBLE POTASSIUM COMPOUNDS.

1,186,522.  Specification of Letters Patent.  Patented June 6, 1916.

No Drawing. Original application filed June 29, 1911, Serial No. 636,118. Divided and this application filed January 29, 1916. Serial No. 75,029. REISSUED

*To all whom it may concern:*

Be it known that I, CARLETON ELLIS, of Montclair, New Jersey, having invented certain new and useful Improvements in Processes of Obtaining Cement and Soluble Potassium Compounds, do hereby declare that the following is a full, clear, and exact description of the same.

The present invention relates to a process of simultaneously producing white Portland or other calcareous cement and potassium compounds, for example potassium salts, and relates particularly to a method of treating potassium-bearing silicate minerals, in combination with lime or other calcareous material, for the production of cementitious bodies, with the simultaneous separation and recovery of a large part of the potassium originally contained in the raw material in the form of potassium chlorid, or other potassium compound suitable for use in the various arts.

The present application is a division of my copending application, Serial No. 636,118, filed June 29, 1911.

Various processes have heretofore been suggested for producing from potassium bearing silicate rocks, the potassium content thereof, in the form of readily soluble potassium salts, but so far as I can ascertain most of the processes heretofore proposed were found to be open to certain objections, and have not come into general commercial use.

As a source of the potassium-bearing mineral, I can employ feldspar, orthoclase, or any other suitable mineral.

Feldspar is particularly suitable as a source of silica in cement making, since the silica present in the feldspar very easily combines with lime, and the alkali of the feldspar acts as a powerful flux during the heating operation, feldspar alone fusing at about 1300° C., while clay requires about 1800° C. Feldspar is also particularly suitable for use in this process on account of its low ratio of alumina to silica, making possible the production of cement very high in silicate and low in aluminate.

As the calcareous material I can use limestone, marl, clay, lime sludges and waste, or gypsum, and in addition thereto, or as a substitution therefor, I can use zinc oxid or carbonate, barium oxid or carbonate, magnesium oxid or carbonate or dolomite for special purposes if desired. I also employ a potassium-volatilizing agent, *e. g.* a halogen compound, such as cryolite, fluorspar, magnesium chlorid, or preferably calcium chlorid. Preference is to be given, in the halogen compounds above referred to, to those which are soluble, since such materials can most readily be completely incorporated with the other ingredients of the raw cement mix, for example by applying said halogen compounds in the form of a solution. In this step I preferably add an amount of the calcium chlorid which will contain chlorin in amount approximately equivalent to the total potassium present in the materials. I also preferably use about as much water as will be evaporated quickly by the heated materials, to leave a dry material which can be directly introduced into the grinder.

As a preferred embodiment of the invention, I first heat together, feldspar and calcareous material, with or without other aluminous or silicious material or both, said mixture being heated to a temperature at which carbon dioxid is readily driven off from calcium carbonate, which heating may be conducted in a rotary kiln. Thereafter this heated material may be sprayed or quenched with a solution of calcium chlorid, or other halogen compound, which renders the materials somewhat friable. Other cement-forming materials can be added at this point if so desired. The starting materials will be so proportioned as to produce a composition at this stage of the process, which will have the proper composition for constituting a cement raw-mix. The mixture of materials may then be finely crushed, if desired, and is then rapidly heated to clinkering and preferably to complete fusion. The mixture should be heated sufficiently to completely liquefy the same, which means a temperature of 1300° C., or slightly above this, during which procedure the major portion of the potassium distils off as potassium chlorid (or other halogen salt), after which the fused material is preferably subjected to the action of a jet of steam or other fluid to atomize or otherwise comminute the same, and to secure the product in a somewhat filamentous form, which can be readily ground to the condition of fineness usual in the Portland cement-making industry.

By virtue of the particular composition of the raw mix, the clinkering and fusion of the cement take place at very much lower temperatures than would be the case if an ordinary Portland cement-mix were employed, which renders the step of fusion of the cement, both more easy and more practical, since it is not necessary to heat the mass to such temperatures as would injuriously affect the final cement, which would be necessary when using an ordinary cement-mix.

The gases and fumes given off in the step of heating the ground mixture to fusion, and particularly during and after the commencement of the fusion step, contain the major portion of the potassium present in the materials under treatment, for example as potassium chlorid, which is distilled off, and which may be removed from the gaseous products in any suitable way, for example by carrying the gases through baffle chambers, settling chambers, or apparatus in which they are treated with water sprays and the like, and the heat of these gases and fumes may likewise be utilized for concentrating the solutions of potassium salts produced in the process.

The feldspar or similar potassium-containing silicious rock, and the calcium chlorid each appears to act as a flux, and to aid both in the production of cement at relatively low temperatures, and in the fusion of the same.

It has heretofore been proposed to employ sulfates, including calcium sulfate in the production of Portland cement. This material is generally open to the objection that during the treatment of the cement making materials at high temperatures, considerable of the sulfate may be reduced to sulfid, which produce an unsound cement.

The material introduced at the commencement of the process, may be finely powdered if desired, but this is generally unnecessary in the present process, since fragmental masses of considerable size may be utilized to advantage, and the crushing or grinding after the calcining step is much more economical.

In case the materials employed are substantially free from iron (or contain only relatively small amounts of this element) the cement produced may be white. The whiteness of the project may be increased by the use of zinc oxid, magnesium compounds and other similarly acting materials, in the raw-mix. Magnesium chlorid may be used, which will function as a halogen salt, and as a whitening agent.

My experiments show that during the melting of the charge some of the potassium chlorid is vaporized. From the melted material a considerable portion of the potassium chlorid vaporizes, while the temperature of the melt may remain substantially constant, although the actual fusion point of the mass is constantly rising. During this part of the process the mass remains liquid, and is in fact in a hyperfused state. Thus this material will be seen to exhibit a considerable melting point hysteresis or lag, which enables the potassium salts to be removed while avoiding such high temperatures as would tend to injure the cement, or reduce its hydraulicity, by the production of an overburned product. The liquid mass goes to the atomizer jets while in this hyperfused state, which renders possible its conversion into a filamentous condition, readily ground to a fine powder.

What I claim is:—

1. The process of making hydraulic cement and potassium compounds which comprises incorporating potassium-bearing silicious material with calcareous material and a quantity of calcium chlorid to furnish chlorin for the potassium present, fusing the mixture at a temperature of approximately 1300° C., whereby potassium chlorid is formed; volatilizing and collecting the potassium material, comminuting the substantially potassium free compounds by exposing the molten material to an aqueous spray and finally grinding the comminuted material.

2. The process of making hydraulic cement and potassium compounds which comprises incorporating potassium-bearing silicious material with calcareous material and a quantity of calcium chlorid, fusing the mixture and volatilizing and collecting the volatilized material, comminuting the substantially potassium-free material by exposing the molten material to an aqueous spray and finally grinding the comminuted material.

3. The process of making hydraulic cement and potassium compounds which comprises incorporating potassium-bearing silicious material with calcareous material and a quantity of calcium chlorid, fusing the mixture at a relatively low temperature approximating the fusing point of feldspar, whereby potassium compounds are liberated, volatilizing and collecting the potassium compounds, comminuting the remaining cementitious material by atomizing the molten material with a pressure jet, and grinding the comminuted material.

4. The process of making a hydraulic cement and potassium compounds which comprises incorporating potassium-bearing silicates with calcareous material and calcium chlorid, fusing of the mixture at a temperature of about 1300° C., and volatilizing and collecting the potassium compounds.

5. The process of making a hydraulic cement and potassium compounds which comprises incorporating feldspar with calcareous material to make a cement raw mix and incorporating a potash, an agent capable of forming relatively volatile compounds with the potassium present, fusing the mixture while employing a temperature of at least incipient fusion of approximately 1300° C., and collecting the sublimate.

6. The process of making a hydraulic cement and potassium compounds which comprises incorporating feldspar with calcareous material to make a cement raw mix and incorporating a haloid salt of an alkali earth metal, fusing the mixture while employing a temperature of at least incipient fusion of approximately 1300° C., and collecting the potassium-bearing sublimate.

7. In the production of valuable products from potassium bearing silicates, the step of fusing together a mixture comprising such a silicate, a calcareous material and a haloid salt of an alkali earth metal.

8. In the production of cement and potassium-halogen compounds, the step of fusing, at a temperature too low to materially injure the cementitious properties of the product, a mixture comprising a feldspathic rock, a calcareous material and an alkali earth metal haloid, and distilling therefrom the major portion of the potassium, as a haloid compound thereof.

9. The step of fusing together a calcareous material, a potassium-containing silicate rock and a haloid compound less volatile than the corresponding potassium halogen compound, said compound being capable of reacting with said silicate rock to produce such potassium-halogen compound.

10. A process of making white cement and potassium salts which comprises incorporating a mixture comprising a potash-containing silicate with calcareous material and a potassium volatilizing agent, heating the mixture to a sufficient temperature to volatilize at least the major portion of the potassium present, while producing a fused mass containing silicious calcareous material, and comminuting the same with a pressure jet.

11. A process of making a hydraulic cement and potassium salts which comprises incorporating potassium containing silicious material, calcareous material and a potassium volatilizing agent, heating the mass sufficiently to fuse the mixture and to volatilize at least the major portion of the potassium present in the form of potassium compounds, collecting the said volatilized compounds, and comminuting the fused material with a pressure jet.

Signed at Montclair, in the county of Essex and State of New Jersey, this 28th day of January, 1916.

CARLETON ELLIS.